Dec. 30, 1924.
S. L. BROWNLOW
BOLL WEEVIL EXTERMINATOR
Filed July 7, 1923   3 Sheets—Sheet 1
1,521,424
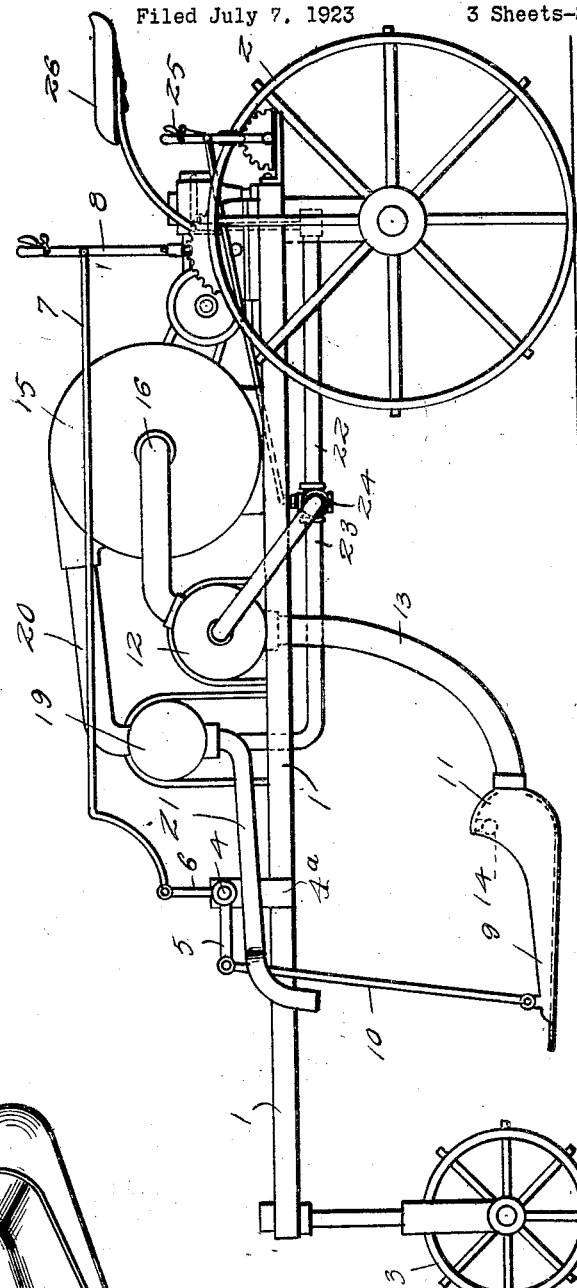
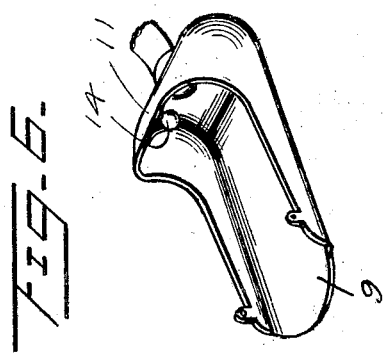
Inventor
S. L. Brownlow
By
Attorney Dec. 30, 1924.
S. L. BROWNLOW
BOLL WEEVIL EXTERMINATOR
Filed July 7, 1923    3 Sheets-Sheet 2
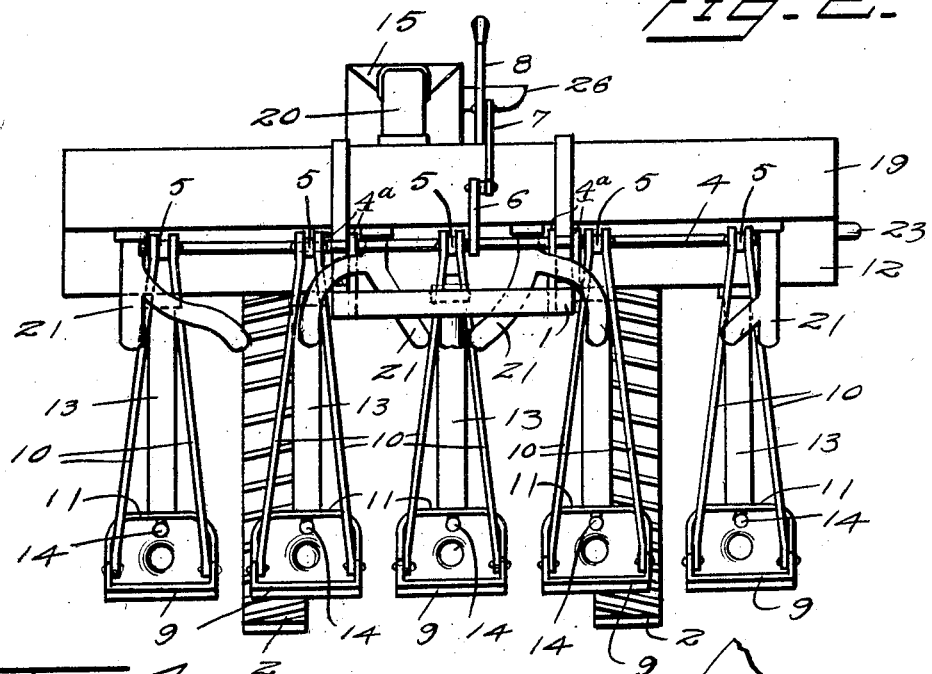
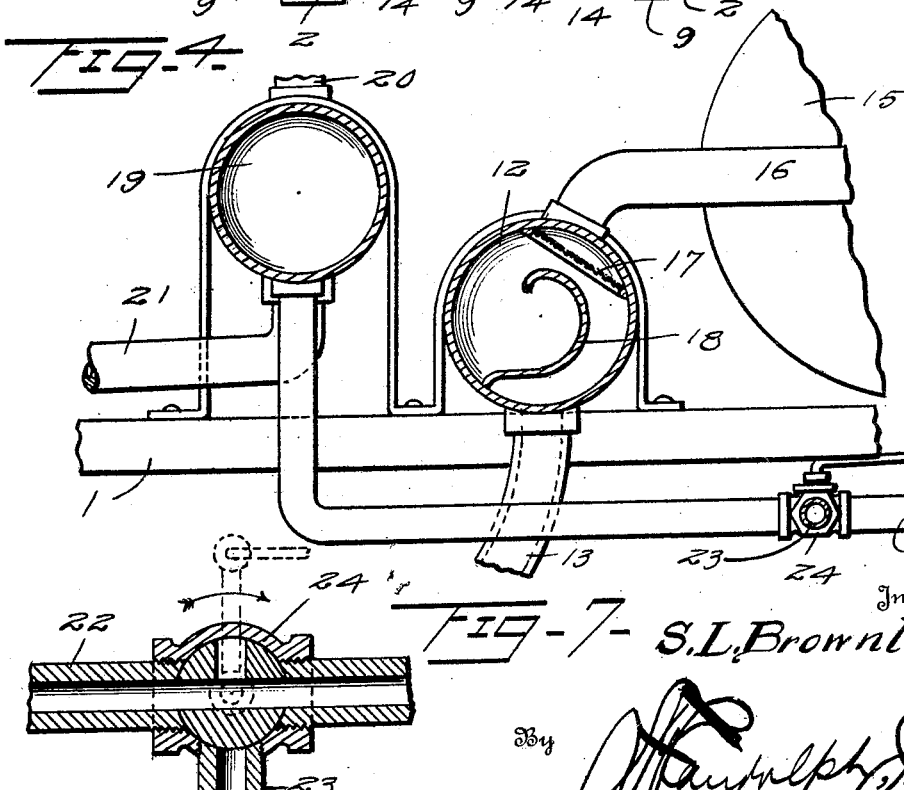

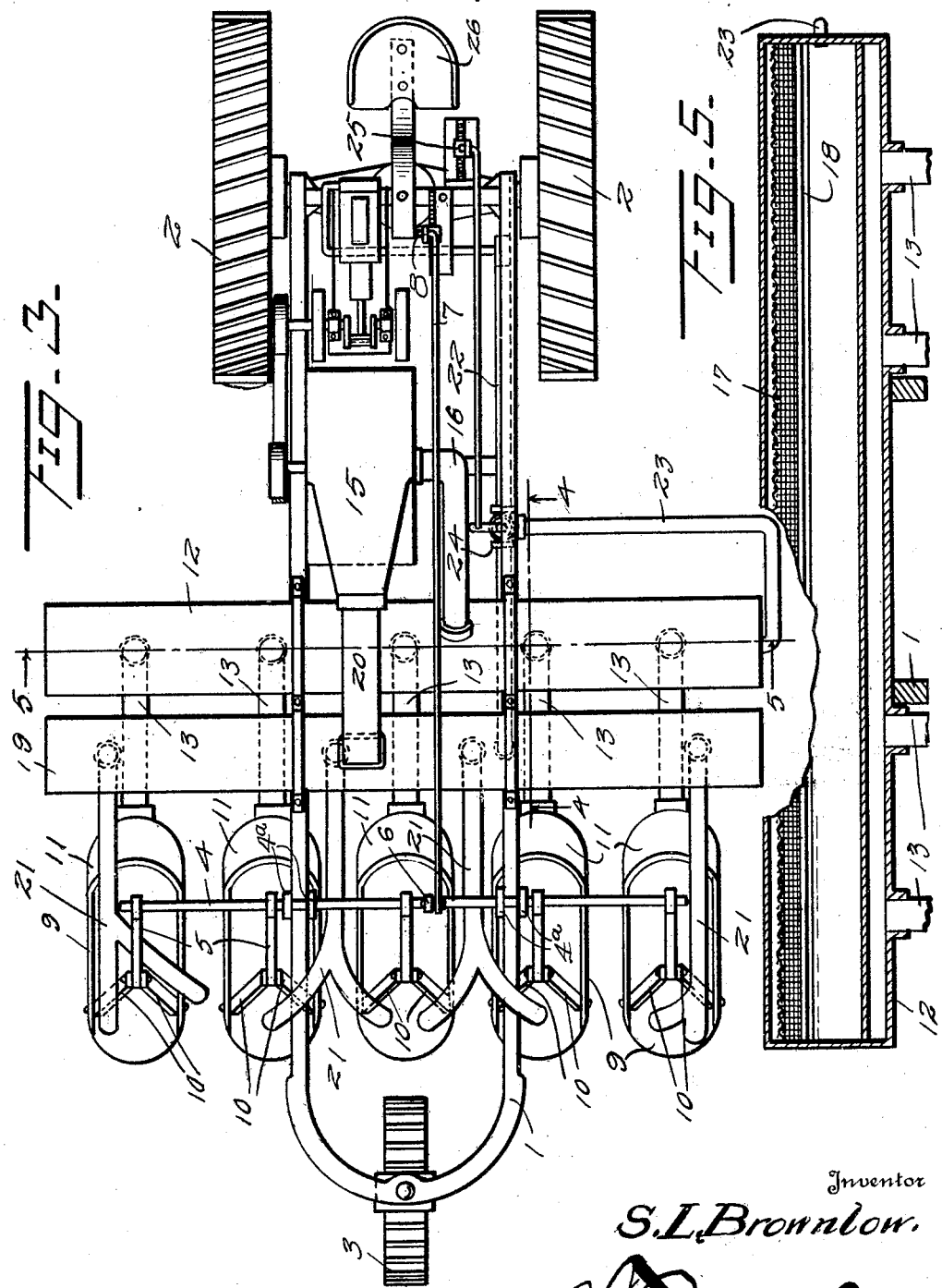

Patented Dec. 30, 1924.

1,521,424

UNITED STATES PATENT OFFICE.

SAMUEL L. BROWNLOW, OF ELMO, ARKANSAS.

BOLL-WEEVIL EXTERMINATOR.

Application filed July 7, 1923. Serial No. 650,136.

*To all whom it may concern:*

Be it known that I, SAMUEL L. BROWN-LOW, a citizen of the United States, residing at Elmo, in the county of Independence and State of Arkansas, have invented certain new and useful Improvements in Boll-Weevil Exterminators; and I do hereby declare the following to be a full, clear, and exact description of the invention, such as will enable others skilled in the art to which it appertains to make and use the same.

The invention has for its object to rid cotton plants of the boll weevil and other insects which are destructive thereto and provides a machine which may be propelled over the field and dislodge the boll weevil from the plants and collect and destroy the insects, thereby ridding the cotton plants of the insects which are destructive thereto.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application:

Figure 1 is a side elevation of a boll weevil exterminator embodying the invention, Figure 2 is a front view of the machine.

Figure 3 is a top plan view thereof,

Figure 4 is a sectional view on the line 4—4 of Figure 3,

Figure 5 is a detail sectional view on the line 5—5 of Figure 3,

Figure 6 is a detail view in perspective of one of the pans, and

Figure 7 is a detail view of the three-way valve for controlling the flow of the exhaust or spent gases from the motive plant, whereby the machine is propelled over the field.

Corresponding and like parts are referred to in the following description and designated in the several views of the drawings by like reference characters.

The numeral 1 designates a suitable frame for supporting the operating parts and is mounted upon wheels 2 and 3, the latter being swivelly mounted to admit of the machine being readily steered. A transversely disposed shaft 4 journaled in brackets 4ª rising from the frame 1 is provided with a plurality of forwardly extending arms 5 and an upwardly extending arm 6, the latter being connected by means of a rod 7 with an operating lever 8 conveniently positioned for ready access when it is required to actuate the same. A plurality of pans 9 are located at the front and transversely of the machine and are connected by means of links 10 with the arms 5 and in consequence rotation of the shaft 4 effects vertical adjustment of the pans. A hood 11 is provided at the rear end of each of the pans 9 and is rearwardly converged to direct the insects into the pipe connected therewith. A tank 12 located rearwardly of the pans 9 is connected therewith by means of pipes 13 which are flexible to admit of movement and adjustment of the pans as may be required. The pipes 13 curve rearwardly and upwardly and connect with the bottom of the tank 12. A light 14, such as an electric bulb, is disposed within the hood of each of the pans and operates to attract the insects, whereby they will be drawn through the pipes 13 and discharged into the tank 12. These lights 14 may derive current from a storage battery or other convenient source of supply. A fan blower 15 is connected by means of a pipe 16 with the upper portion of the tank 12 and operates to create a suction in said tank and the pipes 13, whereby the insects received in the pans 9 are drawn therefrom through the pipes 13 into the tank 12. A screen 17 within the upper rear portion of the tank 12 separates the insects from the air and prevents their being drawn from the tank 12 through the pipe 16 into the casing of the fan blower. The separating screen 17 extends the entire length of the tank 12 and is inclined upwardly and forwardly whereby to direct the insects into the front portion of the tank. A deflector 18, preferably constructed of sheet metal is located within the tank 12 and is spaced from the forward and bottom portions thereof and is attached at its lower edge to the bottom portion of the tank in advance of the pipes 13 and curves upwardly, rearwardly and again upwardly and forwardly, whereby to retain the insects within the front portion of the tank. The deflector 18 likewise extends the entire length of the tank 12 and coacts with the separating screen 17 to direct the insects into the front portion of the tank.

A tank 19, disposed in advance of the tank 12, constitutes a header and is connected with the fan blower 15 by means of a pipe 20. A plurality of branch pipes 21 connect with the tank or header 19 and the delivery ends of the branches are disposed to direct a blast of air upon the plants to dislodge the boll weevil or other insects which are received in the pans 9. A pipe 22 connects with the header 19 and supplies the exhaust or spent gases of an internal combustion engine thereto and this exhaust mixing with the air assists materially in dislodging the insects from the plants. A branch pipe 23 connects the exhaust pipe 22 with the tank 12 and a three-way valve 24, located at the juncture of the pipes 22 and 23, enables the exhaust to be cut off from either one of the tanks 12 or 19, or to be supplied thereto exclusively as required. An operating lever 25, conveniently disposed for ready access by the operator, is connected with the valve 24 to admit of the required adjustment thereof.

In practice, the machine is propelled over the field and may be coupled to a cultivator or hitched to a tractor and the exhaust from the engine of the latter is supplied to the pipe 22 and may be admitted to one or the other, or both of the tanks 12 and 19. When reaching the end of a row, the lever 25 may be operated to cut off the exhaust from the header 19 and supply the same solely to the tank 12, whereby to kill the insects and obviate recourse to other means for destroying the same. As the machine advances over the field, the cotton plants are agitated by the links 10 and pans 9 and the plants thus agitated and supplemented by the air blasts from the pipes 21 and the exhaust gases mixed with the air combine to dislodge the insects which are caused to fall in the pans 9 and are drawn therefrom through the pipes 13 and discharged into the tank 12 to be disposed of in the manner stated. The levers 8 and 25 are readily accessible from the driver's seat 26.

What is claimed is:

1. In a boll weevil exterminator, a pan adapted to receive the insects dislodged from the plants and having its rear end provided with a hood having an open rounded front end.

2. In a boll weevil exterminator, a pan adapted to receive the insects dislodged from the plants and having its rear end provided with a hood to pass readily through the plants, a light disposed within said hood, and an air pipe in communication with the hood to effect delivery of the insects from the pan.

3. In a boll weevil exterminator, a plurality of insect receiving pans, means for raising and lowering the pans, a header, pipes connected with the header and arranged to deliver blasts of air upon the plants to dislodge the insects therefrom, and means for supplying the exhaust from an engine to said header for mixing with the air whereby to materially assist in dislodging the insects from the plants.

4. In a boll weevil exterminator, a plurality of pans, a header, blast pipes leading from the header, and disposed to deliver blasts of air upon the plants to dislodge the insects therefrom, a tank, pipes connecting the tank with the pans for delivering the insects from the latter to the tank, a fan blower adapted to supply air to the header and create a suction in said tank, an exhaust pipe having connection with the header and tank, and a valve in the length of said exhaust pipe to control the supply of the exhaust gas to the header and tank as required.

5. An exterminating machine having a collecting pan, and means operable to discharge exhaust gases from an internal combustion engine into the atmosphere and in the direction of the pan.

6. In an exterminating machine of the class described, means operable to collect insects, and means operable to liberate the exhaust gases from an internal combustion engine into the atmosphere adjacent said last-mentioned means to facilitate the collection of the insects.

7. An exterminating machine having a tank, a blower in communication therewith, a header to receive exhaust gases from an internal combustion engine, said header being in communication with the blower, a branch pipe extending from the header, a flexible pipe extending from the tank, a collecting pan carried by the latter pipe, the branch pipe being arranged to discharge into the atmosphere adjacent the pan, and means adjustably positioning the pan.

8. An exterminating machine of the class described having a header, a tank, a blower associated with said tank, a pipe in communication with the header and tank to supply exhaust gases of an internal combustion engine thereto, control valve means for said pipe, a pan in communication with said tank to collect insects, and branch pipes leading from the header to discharge the gases into the atmosphere and in the direction of the pan.

9. An exterminating machine of the class described having a header, a tank, a pipe in communication with the header and tank to supply exhaust gases of an internal combustion engine thereto, control valve means for said pipe, pans in communication with said tank to collect insects, branch pipes leading from the header to discharge the gases into the atmosphere and in the direction of the pan, a rock shaft, connections between said shaft and the pans, and a connection operable to rock said shaft, and a blower in communication with the tank and header.

In testimony whereof I affix my signature in presence of two witnesses.

SAMUEL L. BROWNLOW.

Witnesses:
R. E. JEFFERY,
R. G. BROWNLOW.